United States Patent [19]
Imai et al.

[11] Patent Number: 6,161,642
[45] Date of Patent: Dec. 19, 2000

[54] ATTACHMENT STRUCTURE FOR FREE-AXLE AIR PUMPS

[75] Inventors: Tsuneaki Imai; Kengo Takagi; Yoshio Kudo; Hiroyuki Watanabe, all of Shizuoka-Ken, Japan

[73] Assignee: Suzuki Motor Corporation, Japan

[21] Appl. No.: 09/174,786

[22] Filed: Oct. 19, 1998

[30] Foreign Application Priority Data

Oct. 20, 1997 [JP] Japan .................................... 9-286420

[51] Int. Cl.[7] ........................ B60K 17/354; B60R 19/48
[52] U.S. Cl. ........................ 180/247; 180/24.1; 293/117; 74/473.11
[58] Field of Search ............................ 293/117; 180/247, 180/24.1; 74/473.11

[56] References Cited

U.S. PATENT DOCUMENTS

| | | | |
|---|---|---|---|
| 4,124,087 | 11/1978 | Borfeld | 293/117 |
| 4,127,295 | 11/1978 | Robinson | 293/117 |
| 4,678,056 | 7/1987 | Kobari et al. | 180/247 |
| 5,121,818 | 6/1992 | McComic | 293/117 |
| 5,141,088 | 8/1992 | Kurihara et al. | 180/247 |
| 5,791,633 | 8/1998 | Walker | 293/117 |

Primary Examiner—Brian L. Johnson
Assistant Examiner—Matthew Luby
Attorney, Agent, or Firm—Morrison Law Firm

[57] ABSTRACT

An attachment structure for free-axle air pumps in differentials positions the free-axle air pump in the dead space behind the front bumper. This simplifies the harness arrangement by removing the free-axle air pump from inside the bonnet, and prevents flying pebbles, water and the like from damaging the free-axle air pump. A rearward extension from the bottom of the front bumper passes below the free-axle air pump to provide additional protection from flying objects and splashing water.

5 Claims, 8 Drawing Sheets

ATTACHMENT STRUCTURE FOR FREE-AXLE AIR PUMPS

BACKGROUND OF THE INVENTION

The present invention relates to an attachment structure for air pumps used in free axles that drive actuators in differentials having a free-axle mechanism. The actuators switch between a standard differential state and a free axle state. Differentials are used to provide smooth, automatic operation of a vehicle without slippage of the drive wheels when a rotation difference between the left and right drive wheels is required. Four-wheel drive vehicles have front differentials and rear differentials. There are also so-called "part-time" four-wheel drive vehicles that allow switching between two-wheel drive and four-wheel drive.

When part-time four-wheel drive vehicles are operated on paved roads, the transfer section switches to two-wheel drive and the vehicle is driven only by the rear wheels. In this case, the front-wheel drive chain, including the front-wheel tires, the drive shaft, the front differential, and the front propeller shaft are all driven by the rear tires. Thus, compared to regular rear-wheel drives, the load on the driven elements is large and fuel consumption is increased. In the type of two-wheel drive to which the present invention applies, the front-wheel drive chain is freed from the drive system, thus preventing loss of power. The front axle is locked to the drive system during four-wheel drive operation, and thus the drive force from the transfer is transferred to the front axle. This kind of free-axle (axle lock) mechanism is used in differentials. This allows the transfer of tire rotation to the differential to be blocked, thus reducing the load on the front differential and the front propeller shaft.

Briefly, when a free-axle mechanism is switched from two-wheel drive to four-wheel drive, shifting the transfer lever causes a synchronization mechanism, added to the front drive clutch, to forcibly synchronize engagement and provide shifting to four-wheel drive. With the activation of the 4WD switch of the transfer, the 4WD controller waits for a fixed time, e.g., one second or less, and then activates a positive-pressure air pump. The positive pressure generated by the air pump is sent to an actuator inside the front differential to lock the axle lock clutch (axle locking), thus making 4WD operation possible.

When switching from four-wheel drive to two-wheel drive, the activation of the 4WD switch of the transfer causes the release valve in the air pump to open to the atmosphere. This lowers the actuator pressure inside the front differential and frees the axle lock clutch.

Referring to FIG. 9, a prior-art free-axle air pump used to drive this type of actuator for free-axle mechanisms is generally placed in the engine compartment. FIG. 9 also shows an attachment structure for free-axle air pumps. FIG. 9 also shows the piping structure inside the bonnet, i.e. in the engine compartment, for a front differential 100 and an air pump 102 attached to a strut tower 101.

One end of a rubber hose 103 is connected to air pump 102. The other end of rubber hose 103 is connected to one end of a metal air pipe 107. Metal air pipe 107 is attached to a front wheel housing panel 104 by clamps 105 and 106. The other end of metal air pipe 107 is connected to a rubber hose 110. Rubber hose 110 emerges from a front differential 100 and extends over a cross member 108 to its connection with metal air pipe 107. An intermediate point of rubber hose 110 is clamped to cross member 108 by a clamp 109. R rubber hose 110 is long enough to accommodate the relative displacement between air pipe 107, coming from air pump 102, and front differential 100.

However, an ever-increasing number of accessories such as anti-lock brake system (ABS) actuators are being placed in the engine compartment. In particular, four-wheel drive vehicles use many accessories. Consequently, finding a location for the installation of accessories in the bonnet is often difficult. Furthermore, with a large number of accessories in the bonnet, wiring harness arrangements become complicated.

OBJECTS AND SUMMARY OF THE INVENTION

It is an object of the present invention is to overcome the problems of the conventional technology described above.

A further object of the present invention is to allow the dead space behind the front bumper to be used efficiently.

Yet another object of the present invention is to simplify the arrangement of wire harnesses by removing the free-axle air pump from inside the bonnet.

Yet another object of the present invention is to provide an attachment structure for free-axle air pumps that can prevent flying pebbles and the like from damaging the free-axle air pump.

In order to achieve the objects described above, the present invention provides an attachment structure for free-axle air pumps that are used in differentials having free axle mechanisms to shift between standard differential and free-axle settings. The free-axle air pump is disposed on the rear side of the front bumper.

The present invention also involves another attachment structure for free-axle air pumps that are used in differentials having free axle mechanisms to shift between standard differential and free-axle settings. The free-axle air pump is disposed roughly at a corner (or intersection) formed by the surface of the bumper member and one of the side members supporting the bumper member from either end. The free-axle air pump is disposed behind the front bumper. In particular, an extension extending from the lower end of the front bumper toward the rear of the vehicle body covers the lower portion of the free-axle air pump.

Since the present invention provides a free-axle air pump disposed roughly at a corner formed between the by surface of the bumper member, which is disposed behind the front bumper, and one of the side members supporting the bumper member from either end, dead space is used efficiently. Also, by having an extension extending from the lower end of the front bumper toward the rear of the vehicle body, the lower portion of the free-axle air pump is covered. Thus, damage to the free-axle air pump due to flying pebbles, water, and the like is prevented.

Briefly stated, the present invention provides an attachment structure for free-axle air pumps in differentials which positions the free-axle air pump in the dead space behind the front bumper. This simplifies the harness arrangement by removing the free-axle air pump from inside the bonnet, and prevents flying pebbles, water and the like from damaging the free-axle air pump. A rearward extension from the bottom of the front bumper passes below the free-axle air pump to provide additional protection from flying objects.

According to an embodiment of the invention, there is provided an attachment structure for mounting a free-axle air pump in a vehicle comprising: a bumper member behind a front bumper of the vehicle, a bracket affixed to a rear of the bumper member, the bracket providing a space between itself and the bumper member, and the free-axle air pump is disposed in the space, whereby the free-axle air pump is moved out of a bonnet of the vehicle and is protected from flying objects and water by the bumper member and the bracket.

According to a feature of the invention, there is provided an attachment structure for a free-axle air pump for controlling shifting in a differential of a 4WD vehicle comprising: a free-axle mechanism in the differential, the free-axle air pump being effective for controlling shifting of the differential between a standard differential state and a free-axle state, and the free-axle air pump is disposed behind a front bumper forward of a bonnet of the vehicle.

According to a further feature of the invention, there is provided an attachment structure for a free-axle air pump in a differential of a vehicle comprising: the vehicle including a free-axle mechanism, the free-axle air pump being of a type capable of shifting the differential between a 4WD and a free-axle state 2WD state, the free-axle air pump is mounted at a position on a rear of a bumper member, and the position being roughly at a corner defined by a rear surface of the bumper member and an inner surface of a longitudinal side member used to support the bumper member.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
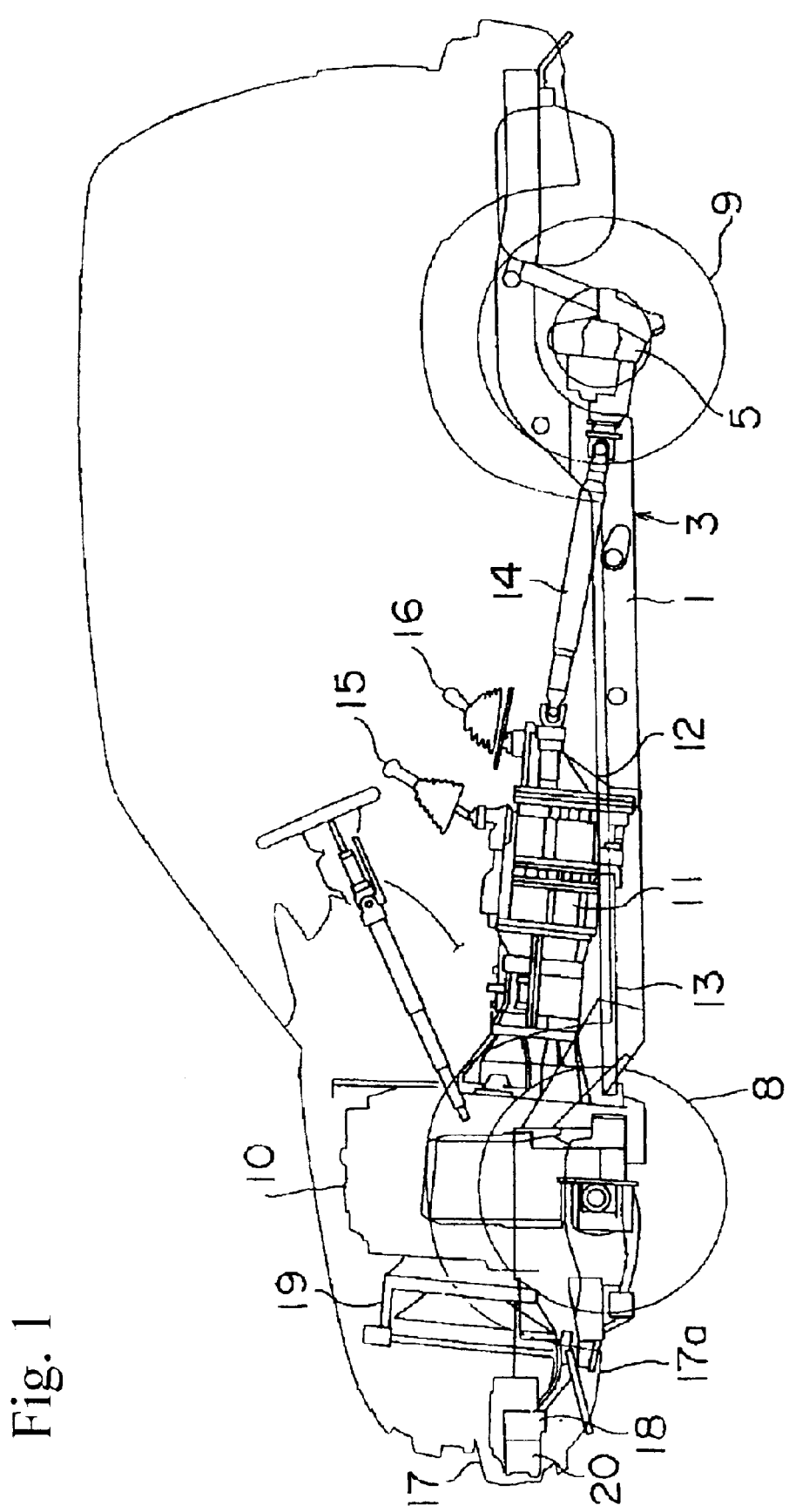
FIG. 1 is a side-view drawing showing the attachment structure for free-axle air pumps according to an embodiment of the present invention.
Figure 2:
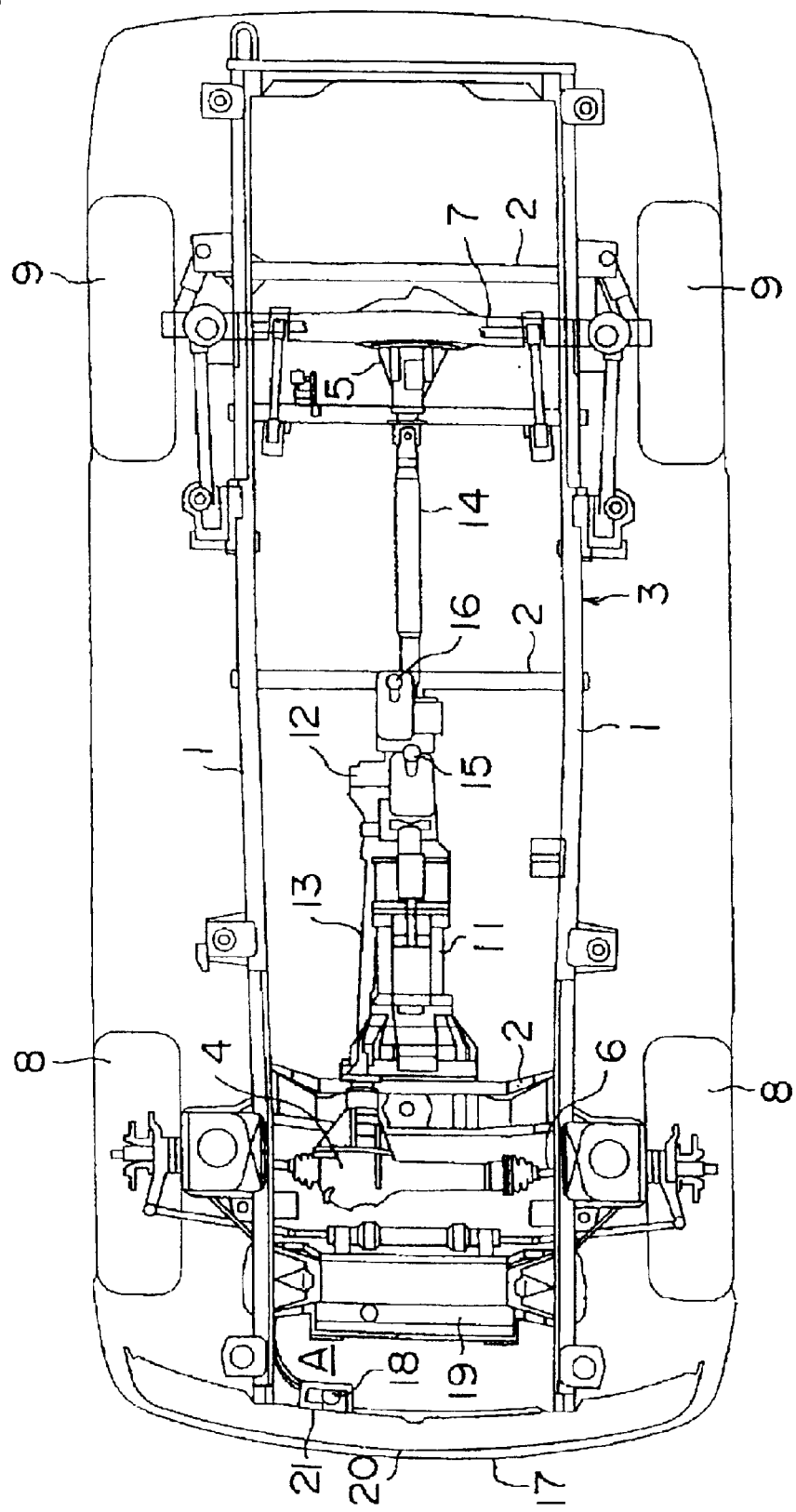
FIG. 2 is a plan drawing of FIG. 1.
Figure 3:
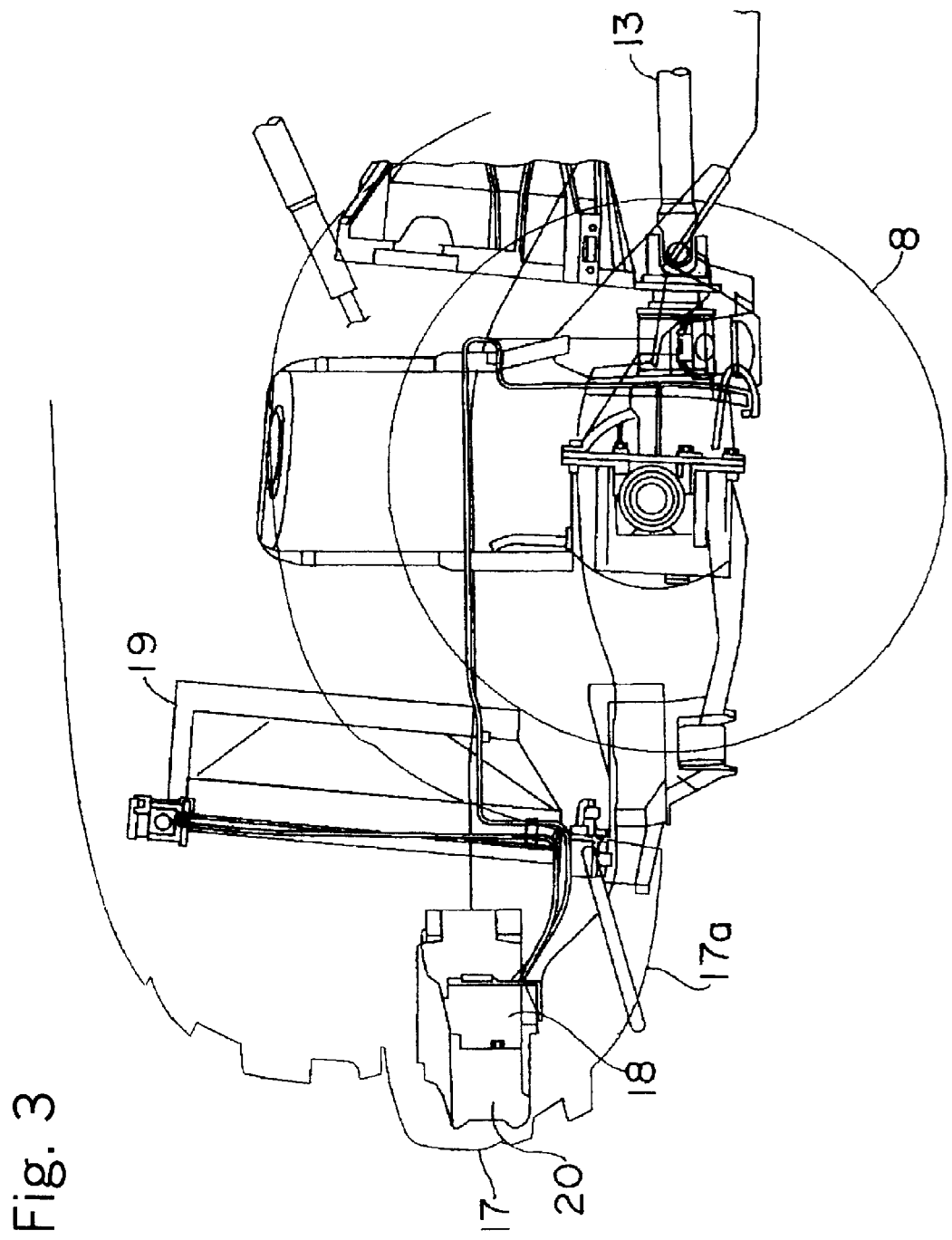
FIG. 3 is an enlarged drawing of the front section of FIG. 1.

Referring to FIGS. 1 and 2, a part-time four-wheel drive vehicle includes chassis frame 3 made up of a pair of side members 1 tied into a rigid structure by a plurality of cross members 2 extending between side members 1. A front differential 4 is mounted on the front side of chassis frame 3. A rear differential 5 is centered in the rear. A front drive shaft 6 and a rear drive shaft 7 are connected to front differential 4 and rear differential 5, respectively. Front wheels 8 and rear wheels 9 are driven by front drive shaft 6 and rear drive shaft 7, respectively.

An engine 10 is mounted on a cross member 2 of chassis frame 3, or on a sub-frame or the like not shown in the drawings. Torque from engine 10 is transferred rearward to a transmission 11 mounted between front drive shaft 6 and rear drive shaft 7. A transfer 12 is connected to transmission 11. Transfer 12 is connected to a front propeller shaft 13 and a rear propeller shaft 14. Front propeller shaft 14 is connected to front differential 4. Rear propeller shaft 14 is connected to rear differential 5.

The shifting of transmission 11 is performed by a transmission shifting lever 15. The shifting of transfer 12 is performed by a transfer shifting lever 16. When transfer shifting lever 16 is shifted from two-wheel drive to four-wheel drive (4WD), power is transferred to front differential 4 by front propeller shaft 13.

Front differential 4 is offset from the center line of the vehicle body toward side member 1. A free-axle mechanism is disposed inside front differential 4. When transfer shifting lever 16 is in the two-wheel drive position, an axle lock clutch in front differential 4 is disengaged. Thus, parasitic drive of the remainder of the front-drive train by the front wheels is prevented. When transfer-shifting lever 16 is shifted from two-wheel drive to four-wheel drive, this free-axle mechanism activates an air pump 18 disposed behind a front bumper 17. The air pressure (positive pressure) generated by air pump 18 activates an actuator (not shown in the drawings) in front differential 4. An axle lock clutch inside front differential 4 is locked and 4WD operation is begun.

Figure 4:
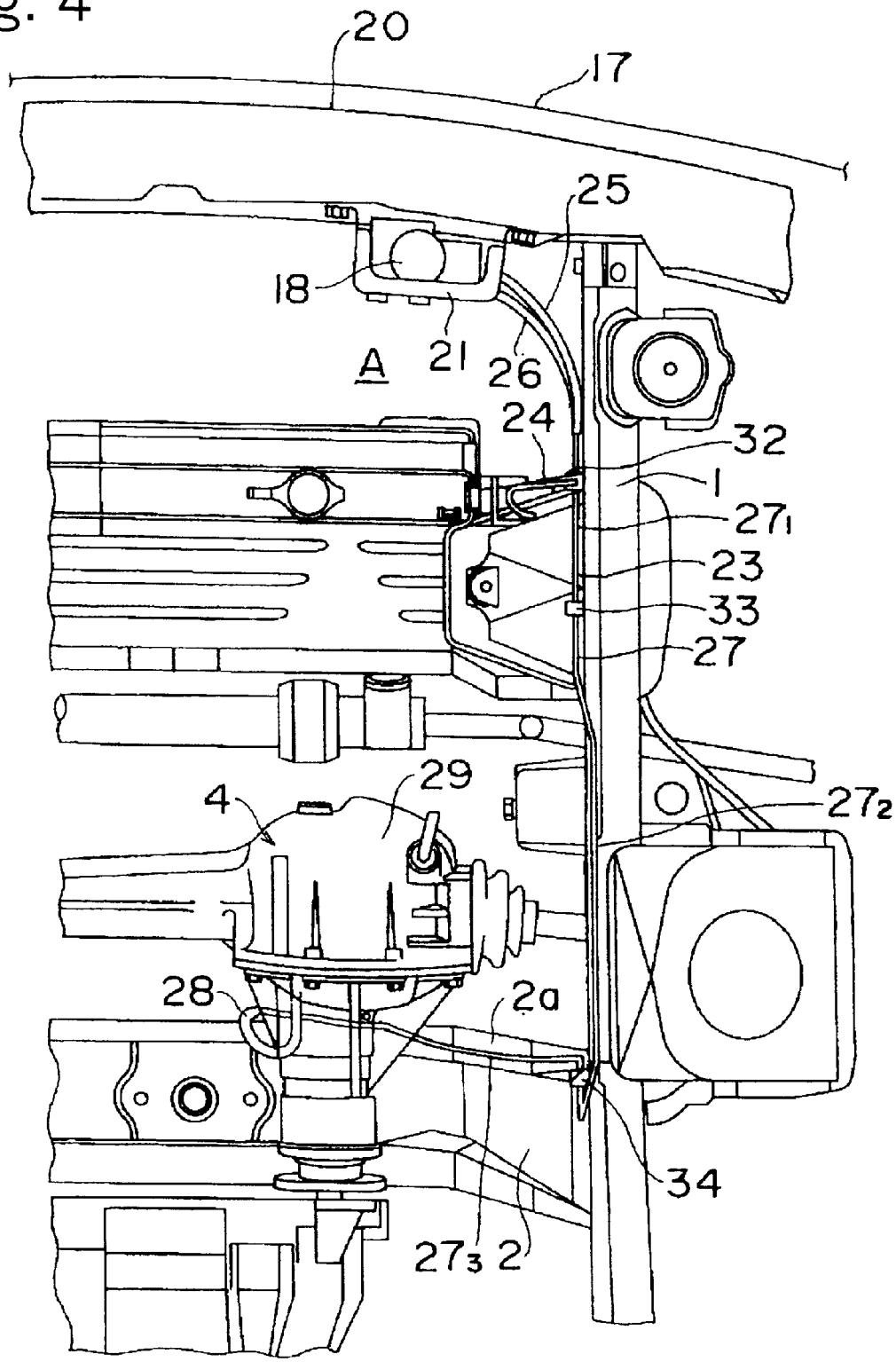
FIG. 4 is an enlarged drawing of the front section of FIG. 2.
Figure 5:
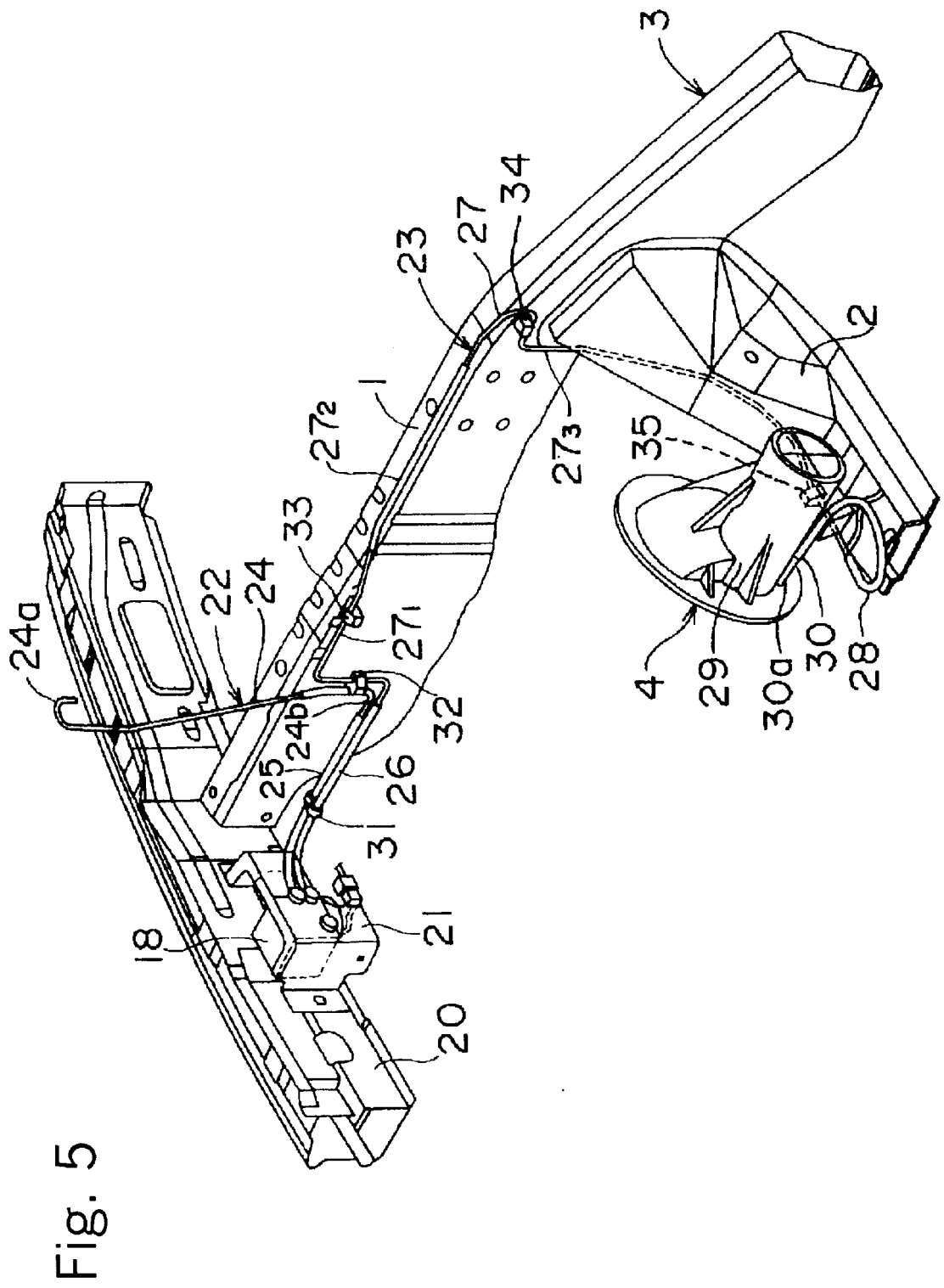
FIG. 5 is a perspective drawing showing the attachment structure for free-axle air pumps according to an embodiment of the present invention.
Figure 6:
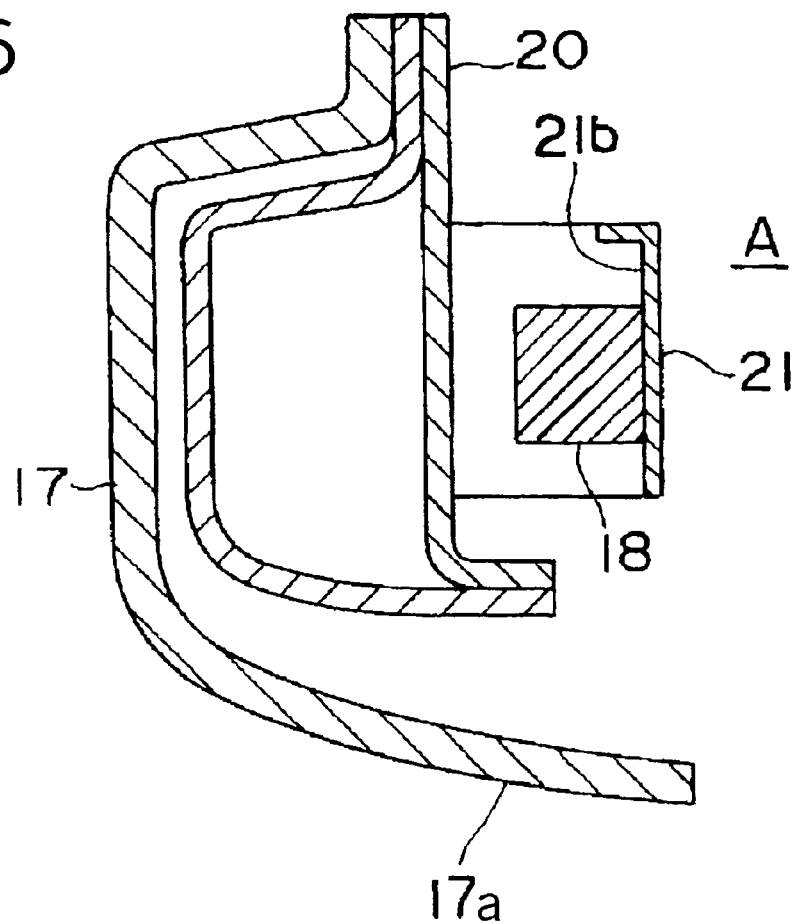
FIG. 6 is a cross-section drawing showing a free-axle air pump attached inside the front bumper.
Figure 7:
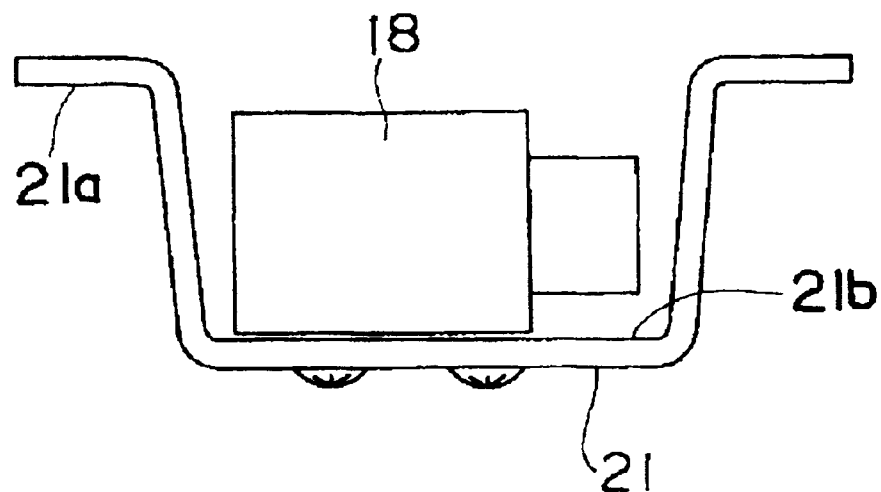
FIG. 7 is a plan drawing showing a bracket used to attach the free-axle air pump of an embodiment of the present invention.

Referring now to FIGS. 5–7, air pump 18 mounted in a bracket 21 that positions air pump 18 behind front bumper 17 in a space behind a cross member (hereinafter referred to as bumper member) 20 in front of radiator 19. Air pump 18 is mounted roughly at the corner of one of side members 1 that support bumper member 20 from either side. Air pump 18 is disposed above an extension 17a of front bumper 17 that extends from the bottom end of front bumper 17 backward toward the rear of the vehicle. Air pump 18 is disposed in a space A (FIGS. 4 and 6) formed by the by surface of bumper member 20 and the inner surface of side member 1. Bracket 21 includes flanges 21a, and a rectangular cavity 21b disposed between flanges 21a. Air pump 18 is mounted in cavity 21b by any convenient hardware such as screws or the like. Left and right flanges 21a of bracket 21 are screwed to the surface of bumper member 20 by screws or the like.

FIG. 5 shows an air pump 18 connected to an air intake pipe 22 for admitting to air pump 18. A supply pipe 23 supplies air from air pump 18 to the actuator inside front differential 4.

Air intake pipe 22 includes an air intake tube 24 and a rubber hose 25. Air intake tube 24 includes an upper end 24a which is bent into a U shape. Air intake tube 24 extends above the engine compartment preferably attached to the upper end of radiator 19, for example. Air intake tube 24 also includes a lower end 24b which is bent in an L shape. Lower end 24b extends in the forward direction of the vehicle toward the location of air pump 18. Rubber hose 25 is connected between the lower end of air intake tube 24 and air pump 18.

Supply pipe 23 connects air to the actuator in front differential 4. Supply pipe 23 includes a rubber hose 26 connected to air pump 18. A pipe device 27 is connected to the end of rubber hose 26. The other end of pipe device 27 passes under the rear end of front differential 4 and extends to a position below a side surface where an air intake opening is formed on front differential 4. A flexible hose 28 connects the end of pipe device 27 to the air intake opening of front differential 4. Air entering the air intake opening of front differential 4 is applied to the actuator in front differential 4 which engages 4WD.

Figure 8:
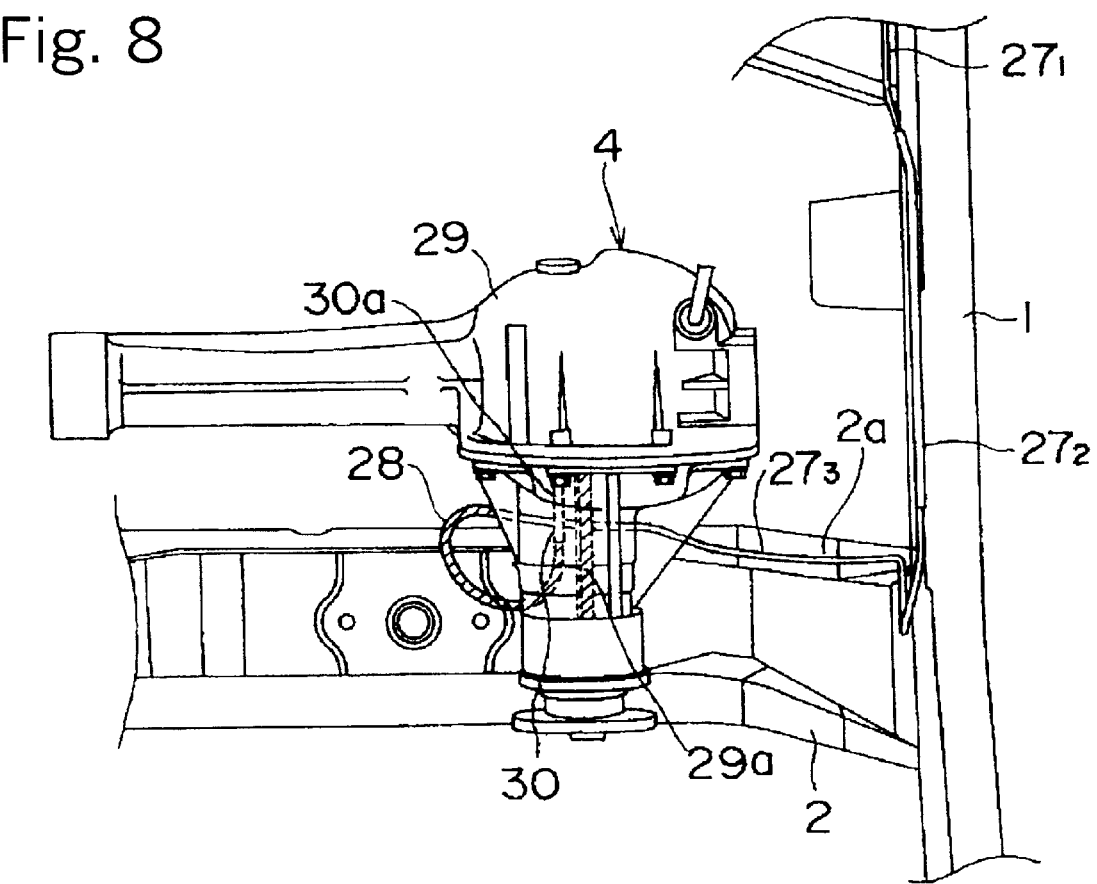
FIG. 8 is a plan drawing showing the pipe structure of the front differential of an embodiment of the present invention.
Figure 9:
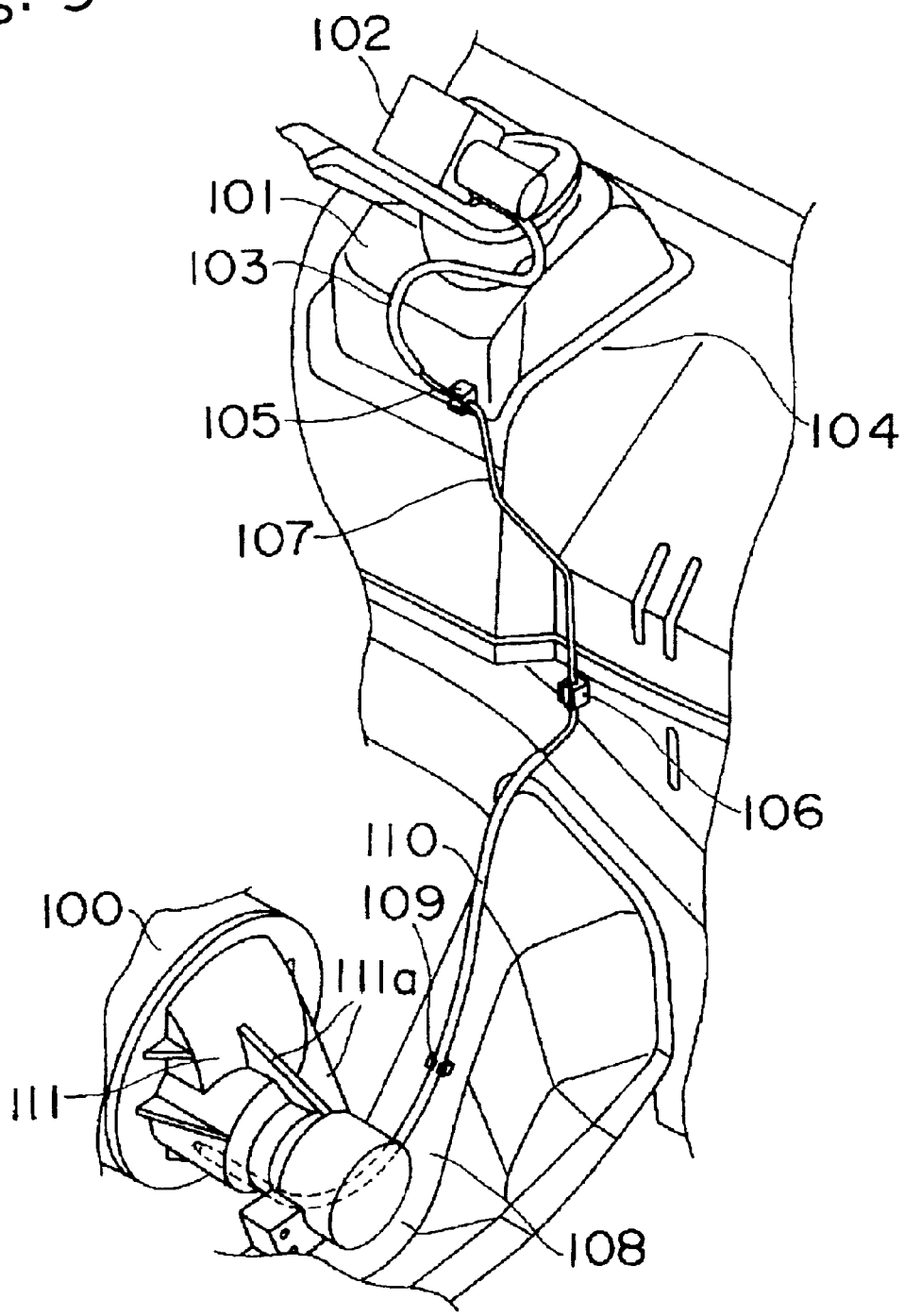
FIG. 9 is a perspective drawing showing a prior-art attachment structure for a free-axle air pump.

Referring momentarily to FIG. 8, pipe device 27 includes pipes 271, 272 and 273. Pipe 271 is connected on one end to hose 26 while the other end extends over the upper surface of side member 1. One end of pipe 272 is disposed along the upper surface of side member 1 and is connected to pipe 271. Pipe 273 is connected on one end to pipe 272 and extends along flange 2a of cross member 2, which passes below front differential 4. The other end of pipe 273 passes under the rear end of front differential 4 to a position below a side surface of front differential 4 where an air intake opening (described later) is formed.

One end of flexible hose 28 is connected to pipe 273. Flexible hose 28 forms a loop that turns away from front differential 4. Pipe 273 extends along a reinforcement rib 29a disposed on the lower portion of a case 29. The end of pipe 272 is connected to an air intake pipe 30a affixed to an air intake opening 30 of the actuator. Air intake pipe 30a passes over or under pipe 273.

Reinforcement ribs 29a reinforce the outer perimeter surface of the rear cylindrical section of case 29 of front differential 4. A plurality of reinforcement ribs 29a are disposed axially at prescribed intervals along the circumference of the outer perimeter surface of the cylindrical section. Reinforcement ribs 29a are disposed on the lower portion of case 29 of front differential 4 projecting downward by a prescribed amount. Ribs 29a move vertically with the motion of front differential 4.

Returning to FIG. 5, hoses 25 and 26 are clamped to each other by clamp 31. The perpendicular sections of air intake tube 24 and pipe 271 are fixed to the side surface of side member 1 by a clamp 32. A horizontal section of pipe 271 on the upper side and a section of pipe 273 toward side member 1 are fixed to the side surface of side member 1 by clamps 33 and 34 respectively. A section of pipe 273 toward front differential 4 is fixed to cross member 2 by clamp 35.

According to the structure described above, air pump 18 is disposed at a corner formed between the rear surface of bumper member 20 disposed behind front bumper 17 and one of side members 1 supporting bumper member 20 from either end. Thus, dead space is used efficiently. Also, extension 17a extends from the lower end of front bumper 17 toward the rear of the vehicle to cover the lower portion of air pump 18. Thus, damage to air pump 18 due to pebbles and water flying up is prevented.

Furthermore, flexible hose 28 sends air from air pump 18 to the actuator and forms a loop away from front differential 4. Flexible hose 28 extends along a side surface of a rib 29a on a lower section of case 29 of front differential device 4 to connect to an air intake opening 30 of the actuator. Thus, even if front differential 4 vibrates due to vibration during vehicle motion or the like, rib 29a does not come into contact with flexible hose 28.

Only metal pipes such as pipe 273 are disposed at the lower portion of case 29 of front differential 4. Thus, rib 29a is prevented from coming into contact with flexible hose 28. Also, since flexible hose 28 is disposed on cross member 2, flying stones, water, etc. are prevented from damaging flexible hose 28.

In the attachment structure for free-axle air pumps according to the present invention as described above, the following advantages are provided.

One advantage is in the attachment structure for free-axle air pumps that are used in differentials having free axle mechanisms to shift between standard differential and free-axle settings. In this case, the free-axle air pump is disposed on the side behind the front bumper. This allows the dead space behind the front bumper to be used efficiently while also simplifying harness arrangements by removing the free-axle air pump from the bonnet.

Another advantage is in the attachment structure for free-axle air pumps that are used in differentials having free axle mechanisms to shift between standard differential and free-axle settings. The free-axle air pump is disposed roughly at a corner formed between the by surface of the bumper member, which is disposed behind the front bumper, and one of the side members supporting the bumper member from either end. Thus, the dead space behind the front bumper is used efficiently while harness arrangements are also simplified because the free-axle air pump is removed from the bonnet.

Another advantage is that an extension extending from the lower end of the front bumper toward the rear of the vehicle body covers the lower portion of the free-axle air pump. Thus, damage to the free-axle air pump due to flying pebbles, water, and the like is prevented.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An attachment structure for mounting a free-axle air pump in a vehicle comprising:

a bumper member behind a front bumper of said vehicle;

a bracket affixed to a rear of said bumper member;

said bracket providing a space between itself and said bumper member;

said front bumper including a rearward directed extension extending from a bottom of said bumper;

said extension passing below said free-axle air pump; and said free-axle air pump is disposed in said space, whereby said free-axle air pump is moved out of a bonnet of said vehicle and is protected from flying objects and water by said bumper member ahead of it, said extension below it, and said bracket alongside it.

2. An attachment structure according to claim 1 wherein:

said free-axle air pump is disposed roughly at a corner formed by a rear surface of said bumper member and a longitudinal side member used to support a side of said bumper member.

3. An attachment structure for a free-axle air pump for controlling shifting in a differential of a 4WD vehicle comprising:

a free-axle mechanism in said differential;

said free-axle air pump being effective for controlling shifting of said differential between a standard differential state and a free-axle state;

a front bumper on said vehicle;

a bumper member between said free-axle air pump and said front bumper;

said free-axle air pump is disposed at least partly in a space behind said front bumper forward of a bonnet of said vehicle; and an extension extending from a bottom of said front bumper below said free-axle air pump to a position toward a rear of said vehicle which, together with said bumper member, and said bumper, protects said free-axle air pump from flying objects.

4. An attachment structure for a free-axle air pump in a differential of a vehicle comprising:

said vehicle including a free-axle mechanism;

said free-axle air pump being of a type capable of shifting said differential between a 4WD and a free-axle state 2WD state;

said free-axle air pump is mounted at a position on a rear of a bumper member;

said position being roughly at a corner defined by a rear surface of said bumper member and an inner surface of a longitudinal side member used to support said bumper member;

a front bumper disposed forward of said bumper member;

said bumper member and said front bumper protecting said free-axle pump from flying objects;

an extension extending rearward from a bottom end of said front bumper; and said extension passing below and protecting a lower portion of said free-axle air pump from flying objects.

5. The attachment structure of claim 4, further comprising:

a generally U-shaped bracket;

said bracket being mounted behind said bumper member;

said bracket defining a space therein; and said free-axle air pump being disposed in said space.

* * * * *